Figure 1:
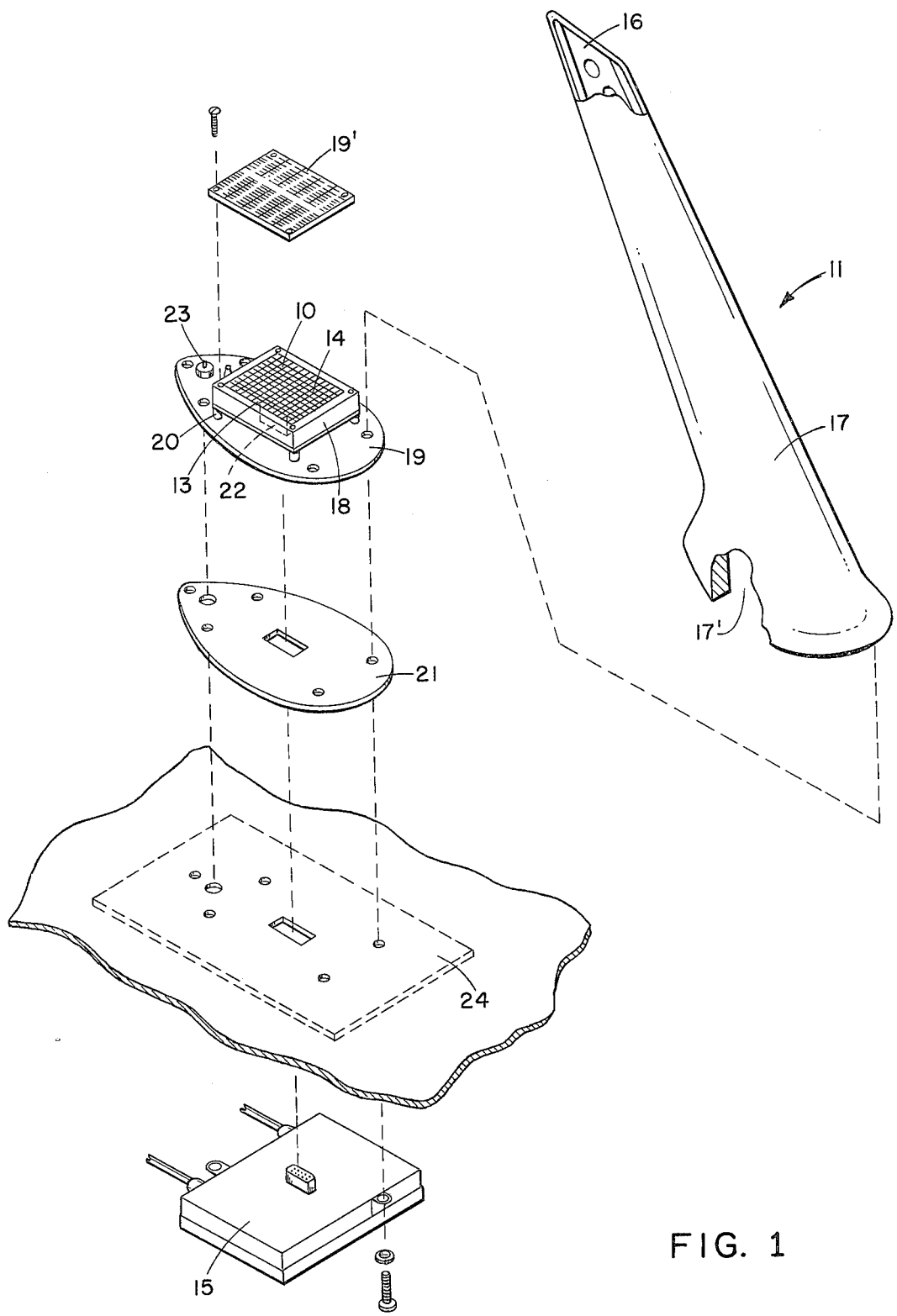

United States Patent

Sawicki et al.

[11] 4,087,817
[45] May 2, 1978

[54] ADF ANTENNA

[75] Inventors: Joseph J. Sawicki; Lester R. Yates, both of Lighthouse Pt.; Reeves T. Shepherd, Margate, all of Fla.

[73] Assignee: The Bendix Corporation, Southfield, Mich.

[21] Appl. No.: 759,709

[22] Filed: Jan. 17, 1977

[51] Int. Cl.² .............................................. G01S 3/42
[52] U.S. Cl. ................................. 343/117 R; 343/728
[58] Field of Search ............................. 343/728, 117 R

[56] References Cited

U.S. PATENT DOCUMENTS

| | | | |
|---|---|---|---|
| 1,597,379 | 8/1926 | Kolster | 343/728 X |
| 3,031,663 | 4/1962 | Wennerberg | 343/117 R |
| 3,323,129 | 5/1967 | Held | 343/728 X |

*Primary Examiner*—Nelson Moskowitz
*Assistant Examiner*—Richard E. Berger
*Attorney, Agent, or Firm*—Bruce L. Lamb; William G. Christoforo

[57] ABSTRACT

A combined loop, sense and communications antenna for aircraft automatic direction finding radio receiver and communications transceiver. A blade-like antenna and a loop antenna are combined in a unitary, streamlined housing of insulating material. The blade antenna serves the dual purpose of providing sense signals to the ADF receiver and of providing a transmitting and receiving antenna for the communications transceiver.

4 Claims, 2 Drawing Figures

ADF ANTENNA

The present invention relates to a combination antenna for automatic direction finder radio receivers and for communications transceivers wherein the sense antenna also serves as an antenna for a communications receiver.

Automatic direction finder (ADF) radio receivers are widely used as navigation instruments on aircraft. As is well known, such receivers provide bearings to radio transmitters by combining the signal from a directive loop antenna with the signal from an omnidirectional sense antenna. Signal from the sense antenna eliminates the ambiguity in the bearing which would exist from use of the loop antenna alone.

One form of loop antenna in wide use is described in U.S. Pat. No. 3,031,663 issued Apr. 24, 1962 to Wennerberg. In this antenna the loop comprises two coils wound at right angles to one another about a rectangular slab of ferrite material. The antenna is electrically rotated rather than physically rotated towards a station by a remotely located goniometer, the stator windings of which are connected to the loop coils.

In an aircraft, the sense antenna is customarily a long wire strung between the vertical stabilizer and a point on the top of the fuselage or strung between vertical posts mounted on the underside of the fuselage. Occasionally, a whip antenna may be used. Either of these types of sense antennas are connected by a transmission line to the front end of the ADF receiver. The characteristics of the transmission line, together with those of the antenna, figure in the tuning of the receiver antenna circuit.

Conventionally, an entirely separate antenna in the form of a wire, whip or mast is provided for communications use.

Structurally, conventional wire or whip antennas leave much to be desired. Both types create undesired wind noise and are subject to damage from vibration, icing, careless handling of the aircraft in storage areas and similar causes. Since the type and location of the sense antenna has heretofore been left to the choice of the user, the various antenna impedances and transmission line lengths found in such custom installations preclude accurate tuning and alignment of the ADF receiver antenna circuit at the factory prior to installation. Frequently the type of sense antenna and location selected do not provide characteristics within the specifications to which the receiver was designed, thus preventing proper tuning and alignment after the installation of the receiver. The foregoing problems apply equally to a separate communications antenna.

In application Ser. No. 585,552 filed June 10, 1975 by S. F. Kadron et al. (now abandoned), owned by the assignee of the present invention, there is described a combined loop and sense antenna for an automatic direction finder receiver which has the advantages of simplifying installation, permitting prealignment of the antenna circuits of the ADF receiver and providing a substantially damage immune structure. The present inventors have discovered that the sense antenna of the Kadron et al. combined loop and sense antenna can be made to serve the dual purpose of a sense antenna for ADF and as a communications antenna thereby completely eliminating installation of a separate antenna for communications while preserving the advantages of the combined loop and sense antenna for ADF.

It is therefore an object of the present invention to provide a combination loop, sense and communications antenna for simultaneous use by an automatic direction finding radio receiver and a communications transceiver enabling a single, unitary body to serve most of the antenna needs of an aircraft.

Another object of the invention is to provide a combination communications antenna and a loop and sense antenna for an ADF receiver which does not affect the quadrantal error of the loop and which provides ADF receiver performance equal or superior to ADF receivers with separated loop and sense antennas.

A further object of the invention is to provide a combination communications and loop and sense antenna for an ADF receiver which is mechanically rugged and aerodynamically efficient and which is sufficiently well insulated to prevent the discharge therethrough of static electricity.

Other objects and advantages of the invention will become evident as an understanding thereof is gained through study of the following description and accompanying drawings.

Briefly, the invention comprises a ferrite loop antenna of planar form. A blade shaped antenna serving the dual purpose of sense antenna and communications antenna is fixed in a plane intersecting the plane of the loop perpendicularly. Preferably, substantially all of the conductive area of the blade antenna is supported at a distance sufficiently removed from the loop plane to prevent unwanted distortion of the loop antenna pattern. The communications transceiver operates in the VHF band and the ADF receiver operates in the low frequency and broadcast bands. The separation in frequency between these bands makes it possible to devise coupling networks connecting the blade antenna simultaneously to the ADF receiver and the communications transceiver which prevent high power transmitted signals from interfering with ADF reception.

The blade antenna and the loop antenna are formed into a unitary body by a molded plastic housing. The housing is streamlined to reduce the aerodynamic drag of the body and presents a T-shaped cross section wherein the horizontal cross of the T contains the section of the loop antenna and the vertical leg thereof contains the section of the blade antenna.

Figure 2:
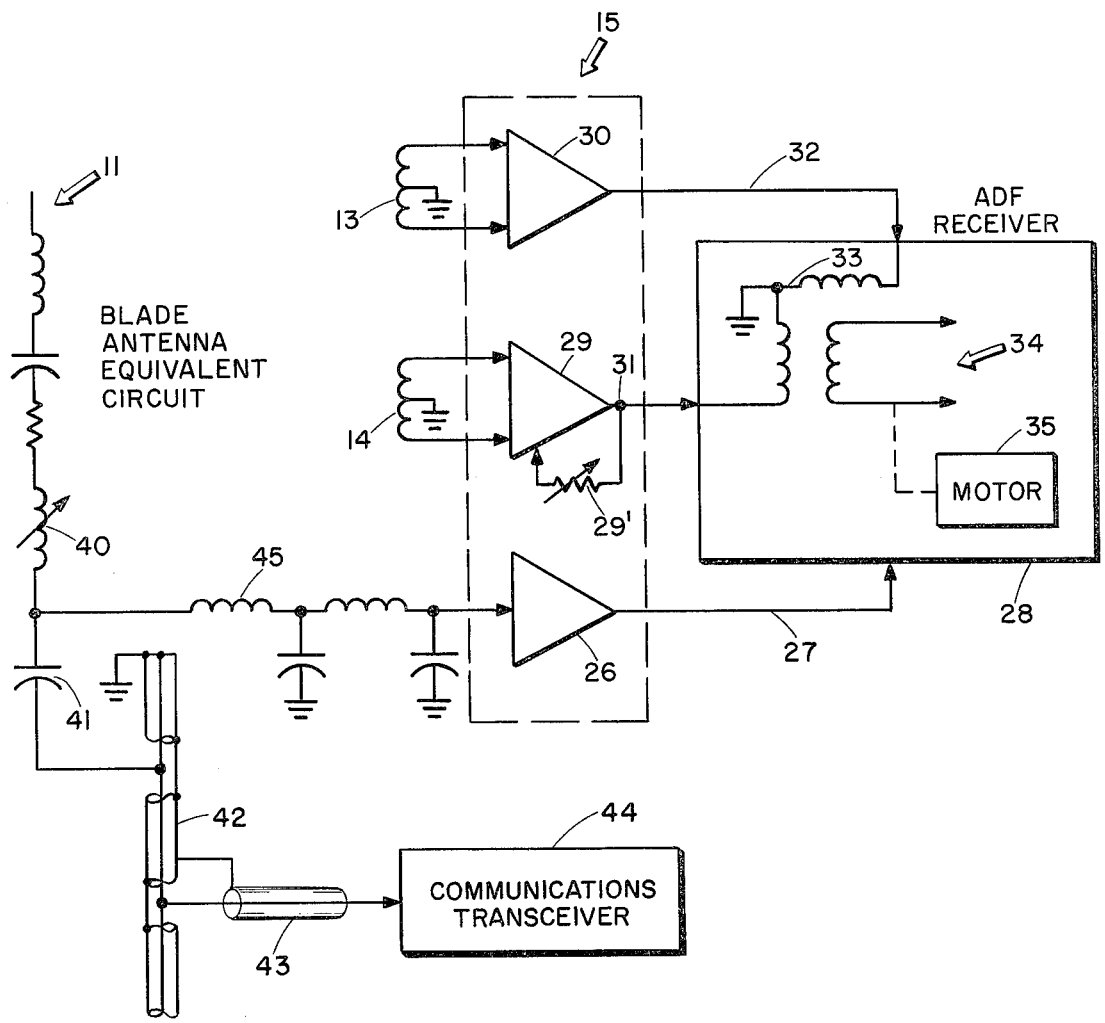

In the drawings:

FIG. 1 is an exploded perspective view of the combination communications antenna and loop and sense antennas for the ADF receiver with portions of the housing thereof broken away; and FIG. 2 is a schematic diagram partially in block form showing the means for coupling the blade and loop antennas to the communications transceiver and the ADF receiver.

Referring to FIG. 1, the invention is shown as comprising a loop antenna 10 of planar form to which a flat plate blade antenna 11 is fixed perpendicularly. Loop antenna 10 is of the type described in the above referenced U.S. Pat. No. 3,031,663 wherein a slab of ferrite material 12 forms a core about which windings 13 and 14 are disposed at right angles to one another. The loop antenna is mounted on an aircraft flush, or nearly so, with the skin of the fuselage, and with the axis of one of the windings extending in the direction of flight. In the above referenced U.S. Pat. No. 3,031,663, preference is shown to a rectangular plan core wherein the ratio of length to width is a design factor which may be varied to compensate for quadrantal error resulting from the unequal sensitivities of windings. In the present invention the core 12 is substantially square in plan and windings 13 and 14 are connected to a preamplifier 15, located within the aircraft near the winding terminations. Correction herein for quadrantal error is provided by differential adjustment of gains of the separate amplifying channels in the preamplifier for signals from each of the windings.

Blade antenna 11 may suitably be constructed of perforated brass plate 16. Antenna 11 extends perpendicularly to loop antenna 10 in a plane parallel to the direction of flight and preferably, but not necessarily, along the longitudinal axis of symmetry of loop 10.

Structural integrity, weather proofing and discharge insulation of the combined antennas 10 and 11 is provided by a molded housing 17 of insulating material. Housing 17 is cast about antenna blade 16, rigidly supporting the same, and includes a cavity 17' in the base thereof for enclosing loop antenna 10. The exterior contours of housing 20 are streamlined to reduce aerodynamic drag. Loop antenna 10 is supported within cavity 17' by a box-like mounting bracket 18 of insulating material which rests upon a printed circuit board 19 providing circuit connections for the loop windings and a coupling circuit hereinafter described. Bracket 18 is covered by a printed circuit board 19', the conductive pattern of which is formed into a grid. The grid is grounded at one point only and provides an electrostatic or Faraday shield for minimizing pick-up by the loop of static noise and of interference from signals transmitted by antenna 11. Bracket 18, boards 19, 19' and the contained loop 10 are secured by insulating standoffs 20 to a base plate 21 adhered to the bottom of housing 17. Connectors 22 and 23 project through the skin of the aircraft to carry connections from the loop windings to preamplifier 15 and from antenna 11 to the VHF transceiver, both of which are located interiorly of the aircraft. A stiffening plate 24 may be used within the aircraft to back up the aircraft skin adjacent to the housing base plate 21 and lend strength to the installation.

FIG. 2 illustrates the loop preamplifier 15 and communications antenna coupling circuit. Blade antenna 11 is here shown as an equivalent circuit comprising an inductor, a capacitor and a resistor connected in series. In one embodiment the values of these equivalents were 130uH, 8pf and 14Ω, respectively. The blade antenna is connected through a tunable inductor 40 and fixed capacitor 41 to a coaxial matching transformer 42. Inductor 40 is adjusted to tune antenna 11 and capacitor 41 to series resonance near the mid-point of the 118–136 MHz VHF band. Transformer 42 comprises a length of coaxial conductor having the inner and outer conductors connected together to ground at one end and open circuited at the other end. Capacitor 41 and the inner conductor of a coaxial transmission line 43 are connected to the inner conductor of transformer 42 at a spacing which provides, together with the lengths of the shorted section and the open section, the proper impedance transformation to match transmission line 43 to antenna 11. Transmission line 43 connects the communications transceiver 44 to antenna 11. Signals in the VHF band pass through inductor 40 and capacitor 41 without being impeded thereby while signals in the low frequency and broadcast bands encounter substantial impedance in capacitor 41.

The preamplifier 15 for the ADF loop and sense signals is designed with broad bandwidth, low output impedance characteristics thereby eliminating susceptibility of the ADF receiver performance to transmission line characteristics. Preamplifier 15 comprises three individual amplifiers of the integrated circuit type. One amplifier 26 having a single-ended input receives the sense signal developed across capacitor 41 through a low pass filter designed to highly attenuate signals in the VHF band without significantly attenuating signals in the low frequency and broadcast bands. The single-ended output of amplifier 26 is conducted by a transmission line 27 to the sense antenna input of the ADF receiver 28.

Amplifiers 29 and 30 are differential amplifiers which receive input from opposite ends of loop windings 13 and 14, center taps of which are grounded. One or the other of amplifiers 29 and 30 is provided with a gain adjustment 29' by which quadrantal error is corrected. The single-ended outputs of amplifiers are connected through transmission lines 31 and 32 to the stator windings 33 of a goniometer 34 located in receiver 24. The rotor of goniometer 34 is positioned in the conventional manner by a servomotor 35 located in the receiver 24. Although the ADF receiver here illustrated employs a goniometer-servomotor for indicating bearings, this type indicator was illustrated because it is well known and the indicator is not a part of the present invention. In ADF receivers of recent design goniometer-servomotors are not used to provide bearing indications. Instead, signals from the loop windings and sense antenna are resolved electronically, and it is to be understood that the combined communications and ADF antenna of the present invention also will serve with ADF receivers of such later design.

The invention claimed is:

1. A combination communications, loop and sense antenna for a communications transceiver and an automatic direction finding radio receiver comprising:
   a fixed loop antenna having a pair of windings disposed at right angles to one another in plane form, and adapted for mounting on an aircraft with the plane of said loop antenna parallel and adjacent to the skin of the aircraft;
   a blade-like antenna supported with the planes of said loop and said blade intersecting perpendicularly, an electrostatic shield extending substantially coextensive with and parallel to the surface of said loop, said shield being interposed between said loop and the end of said blade antenna adjacent said loop;
   a coupling circuit for connecting said blade-like antenna to said communications transceiver and to said direction finding receiver to provide sense signals therefor, said coupling circuit having a total impedance which is relatively low to signals in the very high frequency band and a partial impedance which is relatively low to signals in the low frequency and broadcast bands;
   means connecting said communications transceiver through said total impedance of said coupling circuit to said blade-like antenna;
   means connecting the sense signal input of said direction finding receiver through said partial impedance of said coupling circuit to said blade-like antenna;
   means connecting said loop antenna to said direction finding receiver; and
   a molded unitary housing of insulating material enclosing both said loop and said blade antenna, said housing having a streamlined exterior contour and being generally T-shaped in a cross-section taken in a plane intersecting the planes of both said loop and blade antennas.

2. A combination antenna as claimed in claim 1 wherein said loop antenna includes a core of ferrite material in the form of a fixed flat plate and about which said windings are wound.

3. A combination antenna as claimed in claim 1 wherein said coupling circuit includes an inductor and a capacitor connected in series between said blade-like antenna and said communications transceiver with said capacitor adjacent said communications transceiver; and wherein said means connecting said sense signal input of said direction finding receiver is connected to the junction of said inductor and said capacitor.

4. A combination antenna as claimed in claim 3 wherein said means connecting said capacitor to said direction finding receiver includes a low pass filter capable of passing without significant attenuation signals in the low frequency and broadcast bands while highly attenuating signals in the very high frequency band.

* * * * *